(12) United States Patent
Cruz

(10) Patent No.: US 9,267,411 B2
(45) Date of Patent: Feb. 23, 2016

(54) PRESSURIZED TANK VEHICULAR FLUID DELIVERY SYSTEM

(71) Applicant: Cummins Emission Solutions, Inc., Columbus, IN (US)

(72) Inventor: Thyago Cruz, Sá o Paulo (BR)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 240 days.

(21) Appl. No.: 13/967,755

(22) Filed: Aug. 15, 2013

(65) Prior Publication Data

US 2015/0047321 A1 Feb. 19, 2015

(51) Int. Cl.
*F01N 3/00* (2006.01)
*F01N 3/02* (2006.01)
*F01N 3/10* (2006.01)
(Continued)

(52) U.S. Cl.
CPC .............. *F01N 3/208* (2013.01); *B60T 17/06* (2013.01); *F01N 3/021* (2013.01); *F01N 3/2066* (2013.01); *F01N 3/22* (2013.01); *F01N 2250/02* (2013.01); *F01N 2390/04* (2013.01); *F01N 2590/08* (2013.01); *F01N 2610/02* (2013.01); *F01N 2610/085* (2013.01); *F01N 2610/1406* (2013.01);
(Continued)

(58) Field of Classification Search
CPC ....... B60T 17/06; F01N 3/021; F01N 3/2066; F01N 3/208; F01N 3/22; F01N 2250/02; F01N 2390/04; F01N 2590/08; F01N 2610/02; F01N 2610/085; F01N 2900/1808; F01N 2900/1824

USPC ........................................... 60/286, 295, 280
See application file for complete search history.

(56) References Cited

U.S. PATENT DOCUMENTS 7,743,603 B2   6/2010   Nishina et al.
8,387,371 B2   3/2013   Zhang et al.
(Continued)

FOREIGN PATENT DOCUMENTS

EP   0 487 886   6/1992
EP   1 612 381   1/2006
(Continued)

OTHER PUBLICATIONS

EP 2199557 Al Machine Translation Done May 2, 2015.*
(Continued)

*Primary Examiner* — Audrey K Bradley
*Assistant Examiner* — Dapinder Singh
(74) *Attorney, Agent, or Firm* — Foley & Lardner LLP

(57) ABSTRACT

Systems and methods for delivering a vehicular fluid to a component of the vehicle. A reductant delivery system of a selective catalytic reduction system delivers the vehicular fluid to the component of the vehicle. The reductant delivery system includes a compressed air source, a tank in fluid communication with the compressed air source, a dosing module in fluid communication with the tank, and a control module electrically coupled to the compressed air source. The tank may contain a diesel exhaust fluid and the dosing module is in fluid communication with the component that receives the diesel exhaust fluid. The control module regulates an amount of air pressure in the tank to deliver the vehicular fluid to the dosing module. The system omits a vehicular fluid pump such that the compressed air from the compressed air source pressurizes the dosing module with the vehicular fluid.

20 Claims, 4 Drawing Sheets

(51) Int. Cl.
*F01N 3/20* (2006.01)
*F01N 3/021* (2006.01)
*F01N 3/22* (2006.01)
*B60T 17/06* (2006.01)

(52) U.S. Cl.
CPC . *F01N 2610/1493* (2013.01); *F01N 2900/1808* (2013.01); *F01N 2900/1824* (2013.01)

(56) References Cited

U.S. PATENT DOCUMENTS

| | | | |
|---|---|---|---|
| 8,393,142 | B2 | 3/2013 | Mupparapu et al. |
| 2004/0177606 | A1 | 9/2004 | Scharsack |
| 2007/0036694 | A1 | 2/2007 | Nishioka et al. |
| 2011/0138790 | A1 | 6/2011 | Radillo et al. |
| 2011/0283689 | A1 | 11/2011 | Wilkins |
| 2012/0279576 | A1* | 11/2012 | Hennecke et al. ............ 137/1 |
| 2012/0286063 | A1 | 11/2012 | Wang et al. |

FOREIGN PATENT DOCUMENTS

| | | |
|---|---|---|
| EP | 1 956 207 | 8/2008 |
| EP | 2199557 A1 * | 6/2010 |

OTHER PUBLICATIONS

Cummins Emission Solutions, EcoFit Urea Dosing System, Bulletin 4973772, Oct. 1, 2011, 2 pages.

D. Needham et al., Delphi SCR Dosing System—An Alternative Approach for Close-Coupled SCR Catalyst Systems, SIA Diesel International Conference, Rouen, France, Jun. 1, 2012, 7 pages.

* cited by examiner

PRESSURIZED TANK VEHICULAR FLUID DELIVERY SYSTEM

TECHNICAL FIELD

The present application relates generally to the field of automotive fluid delivery systems. More specifically, the present application relates to fluid delivery systems for selective catalytic reduction (SCR) systems.

BACKGROUND

In vehicles having internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system of the vehicle. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up stream of the catalyst chamber.

SUMMARY

One implementation relates to a system for supplying a fluid in a vehicle. The system includes a compressed air source, a tank in fluid (e.g., air) communication with the compressed air source, a dosing module in fluid communication with the tank, and a controller mechanism coupled to the compressed air source and the dosing module. The tank is configured to contain a vehicular fluid. The dosing module is in fluid communication with a component of a vehicle that receives the vehicular fluid. The controller mechanism is configured to regulate an amount of air pressure in the tank and control the dosing of the vehicular fluid using the dosing module. The system does not include a vehicular fluid pump such that compressed air from the compressed air source pressurizes the dosing module with the vehicular fluid.

Another implementation relates to a method for controlling delivery of a vehicular fluid. The method includes using a control module to pressurize a tank containing the vehicular fluid using compressed air from a compressed air source. The method further includes selectively releasing, using the control module, the vehicular fluid to a component of a vehicle via a dosing module. No vehicular fluid pump is in fluid communication with either the tank or the dosing module such that the compressed air from the compressed air source pressurizes the dosing module with the vehicular fluid acting as a pumping mechanism.

Yet a further implementation relates to a reductant delivery system for supplying a fluid for a selective catalytic reduction system of a vehicle having an engine that produces an exhaust gas containing nitrogen oxide. The reductant delivery system consists essentially of a compressed air source, a tank in fluid (e.g., air) communication with the compressed air source, a dosing module in fluid communication with the tank, a relief valve in communication with the tank and the dosing module, and a controller mechanism coupled to the compressed air source. The tank is configured to contain a diesel exhaust fluid. The dosing module is in fluid communication with a component of a vehicle that receives the diesel exhaust fluid. The relief valve is configured to purge compressed air from the tank in response to a deactivation of the vehicle. The controller mechanism is configured to regulate an amount of air pressure in the tank. In some implementations, the reductant delivery system may further comprise a manometer or other pressure sensor.

These and other features of the implementations described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for introducing a reductant to an exhaust system using a pressurized tank. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
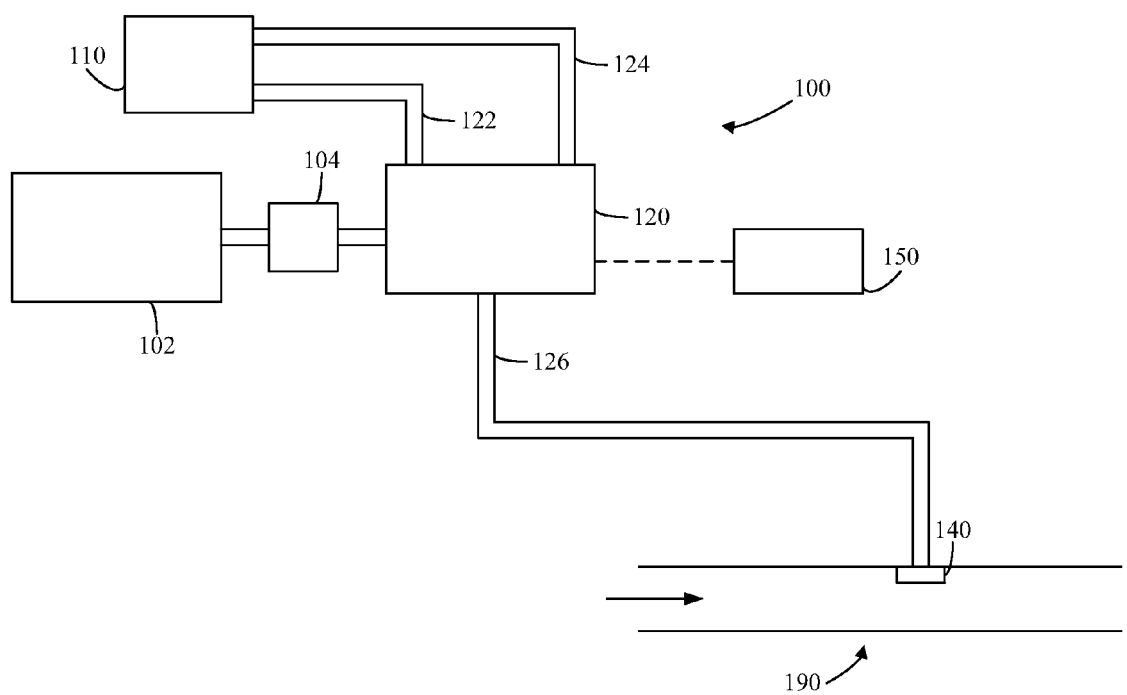
FIG. 1 is a block schematic diagram of a reductant delivery system having an air-assisted vehicular fluid pump for a selective catalytic reduction system.
Figure 2:
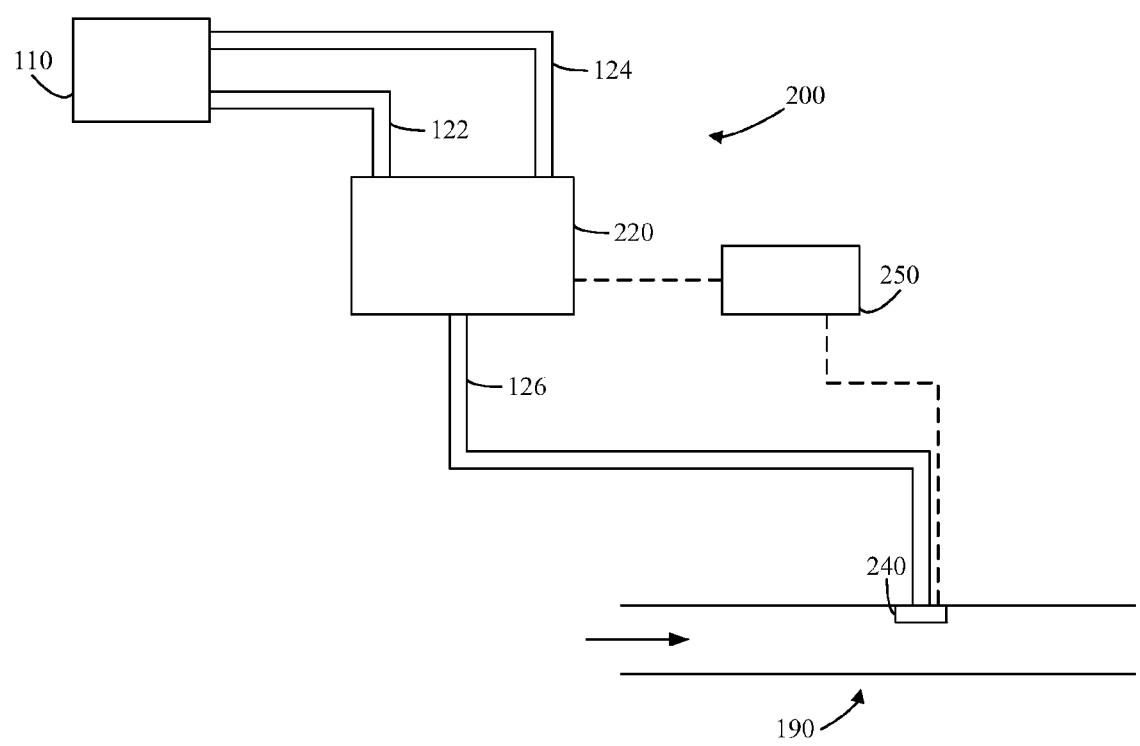
FIG. 2 is a block diagram of a reductant delivery system having an airless vehicular fluid pump for a selective catalytic reduction system.

FIGS. 1 and 2 depict two examples of conventional reductant delivery systems 100, 200 for delivering a vehicular fluid to a component of a vehicle. Referring briefly to FIG. 1, one example conventional reductant delivery system 100 includes an air-assisted vehicular fluid pump 120, such as an air-assisted dosing pump offered by EMITEC Inc., for delivering a vehicular fluid, such as a diesel exhaust fluid of urea, to a dosing module 140. The dosing module 140 is disposed within a portion 190 of an exhaust system of a vehicle to dose the vehicular fluid into the exhaust gases flowing therein.

In the example system 100 shown in FIG. 1, the air-assisted vehicular fluid pump 120 is in fluid communication with and fluidly coupled to a vehicle compressed air source 102, such as an air compressor coupled to the engine, a turbocharger, a supercharger, and/or any other compressed air generating source of a vehicle. Interposed between and in fluid communication with both the vehicular compressed air source 102 and the air-assisted vehicular fluid pump 120 is an air-oil separator 104. The air-oil separator 104 may include a coalescing filter to remove oil from the compressed air of the vehicular compressed air source 102. The vehicular compressed air source 102, the air-oil separator 104, and the air-assisted vehicular fluid pump 120 may be fluidly coupled by piping, hosing, direct attachment, and/or any other manner to enable fluid, such as air from the vehicular compressed air source 102, to flow to the air-assisted vehicular fluid pump 120.

The air-assisted vehicular fluid pump 120 is coupled to a tank 110 of vehicular fluid via a suction line 122 and a return line 124. The air-assisted vehicular fluid pump 120 utilizes the compressed air from the vehicular compressed air source 102 to assist in pumping the vehicular fluid out of the tank 110 and into a fluid line 126 fluidly coupling the air-assisted vehicular fluid pump 120 to the dosing module 140 and to refrigerate the nozzle of the dosing module 140. The vehicular compressed air source 102 may provide compressed air at approximately 8 bar to 10 bar to the air-assisted vehicular fluid pump 120. The vehicular fluid output from the air-assisted vehicular fluid pump 120 may be pressurized to the dosing module 140 at approximately 4.5 bar. The dosing module 140 of this system 100 may include 3 or 4 hole nozzles to deliver and spray the vehicular fluid into the portion 190 of the exhaust system. However, other configurations for the dosing module 140 may also be used.

A control module 150 is electrically coupled to the air-assisted vehicular fluid pump 120 and is configured to define and output to the air-assisted vehicular fluid pump 120 the amount of vehicular fluid to be dosed or injected. The air-assisted vehicular fluid pump 120 is configured to dose the correct amount of vehicular fluid. Thus, the control module 150 is only electrically coupled to the air-assisted vehicular fluid pump 120.

Another example conventional reductant delivery system 200 includes an airless vehicular fluid pump 220, such as an airless supply unit of the Denoxtronic 2.2 Urea Dosing System offered by Robert Bosch GmbH, for delivering a vehicular fluid, such as a diesel exhaust fluid of urea, to a dosing module 240. The dosing module 240 is disposed within a portion 190 of an exhaust system of a vehicle to dose the vehicular fluid into the exhaust gases flowing therein. Engine coolant is utilized to refrigerate a nozzle of the dosing module 240.

In the example system 200 shown in FIG. 2, the airless vehicular fluid pump 220 is coupled to a tank 110 of vehicular fluid via a suction line 122 and a return line 124. The airless vehicular fluid pump 220 utilizes an internal fluid pump to pump the vehicular fluid out of the tank 110 via suction line 122 and into the fluid line 126 fluidly coupling the airless vehicular fluid pump 220 to the dosing module 240. The vehicular fluid output from the airless vehicular fluid pump 220 may be pressurized to the dosing module 240 at approximately 9 bar in one particular implementation, although the pressurization level may vary depending upon the particular system requirements and specifications.

A control module 250 is electrically coupled to the airless vehicular fluid pump 220 and the dosing module 240. Accordingly, the control module 250 is configured to define and output to the airless vehicular fluid pump 220 and the dosing module 240 the amount of vehicular fluid to be dosed or injected. The airless vehicular fluid pump 220 is configured to deliver the vehicular fluid to the fluid line 126 coupling the airless vehicular fluid pump 220 to the dosing module 240 at the correct pressure and flow. The dosing module 240 is configured to dose the correct amount of vehicular fluid to the portion 190 of the exhaust system of the vehicle. Thus, the control module 250 is electrically coupled to only two components, the airless vehicular fluid pump 220 and the dosing module 240.

Both of the foregoing systems 100, 200 include two stages for delivering the vehicular fluid to the component of the vehicle: (1) transportation of the vehicular fluid from a tank to a nozzle and (2) controlling the dosing quantity of the vehicular fluid to the component of the vehicle. In both systems 100, 200, two separate components are utilized to perform the two stages. That is, for system 100, the air-assisted vehicular fluid pump 120 controls the dosing of the vehicular fluid and the vehicular compressed air source 102 transports the vehicular fluid to the dosing module 140. For system 200, the dosing module 240 controls the dosing of the vehicular fluid and the pressure provided by the airless vehicular fluid pump 220 transports the vehicular fluid to the dosing module 240.

According to various embodiments or implementations, systems are provided which eliminate the use of pumps while still accomplishing the two stages discussed previously to deliver the vehicular fluid to the component of the vehicle. Such a system may reduce the cost (both by eliminating the initial cost of pumps 120, 220 and by not needing to replace pumps, which may wear out over time), eliminate the suction and return lines (and potentially a heating system), and simplify the overall system.

Figure 3:
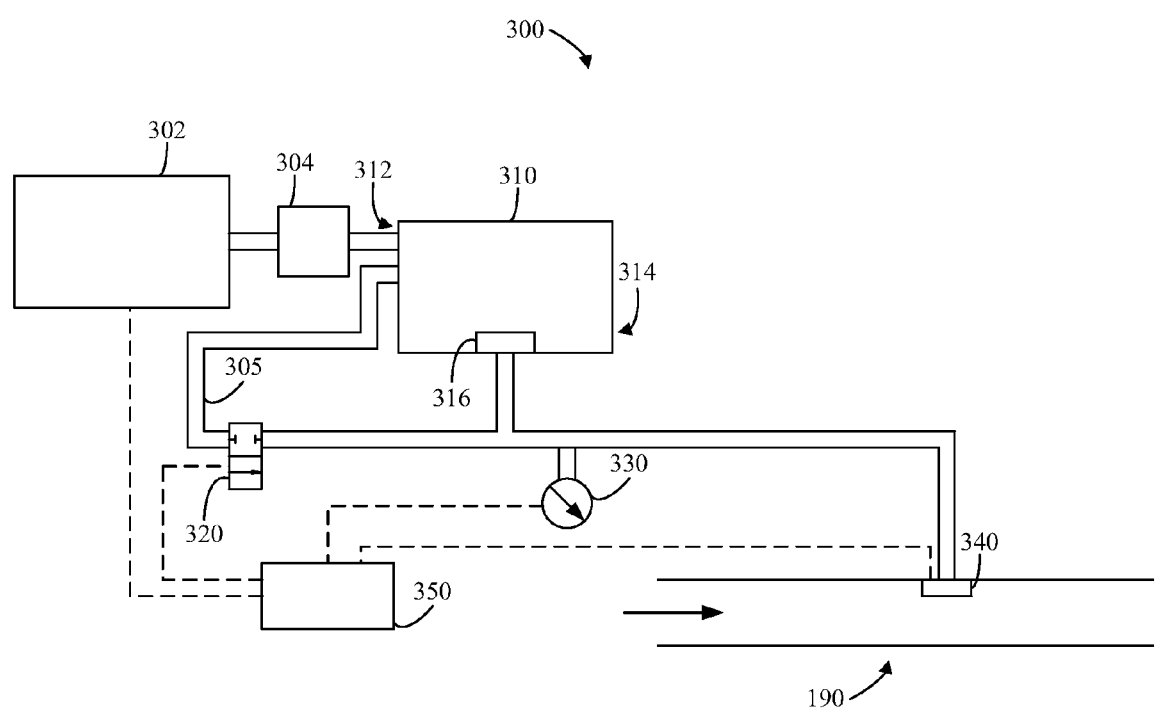
FIG. 3 is a block schematic diagram of an example reductant delivery system of a selective catalytic reduction system having a pressurized tank.

FIG. 3 depicts an example of such a fluid delivery system, such as a reductant delivery system 300 for a SCR system, for a vehicle. reductant delivery system 300 delivers a reductant, such as anhydrous ammonia, aqueous ammonia, or urea to an exhaust gas flow in an exhaust system of a vehicle. While the implementation described herein is in reference to a reductant delivery system 300, it should be understood that the system described herein may be utilized a wide variety of fluids. The exhaust system is coupled to an engine, such as a diesel engine, and receives exhaust gases from the engine after combustion. In addition to the reductant delivery system 300, the SCR system may also include a SCR catalyst in fluid communication with the exhaust system and downstream from the dosing module 340. The SCR system may further include a diesel oxidation catalyst (DOC) in fluid communication with the exhaust system to oxidize hydrocarbons and carbon monoxide in the exhaust gas. The SCR system may include a diesel particulate filter (DPF) in fluid communication with the exhaust system to remove particulate matter, such as soot, from the exhaust gas.

In the present example, the reductant delivery system 300 of the SCR system includes a compressed air source 302, an air-oil separator filter 304, a tank 310, a relief valve 320, a manometer 330, a dosing module 340, and a controller mechanism 350. The compressed air source 302 may include a vehicle compressed air source, such as an air compressor coupled to the engine, a turbocharger, a supercharger, and/or any other compressed air generating source of a vehicle. In some other implementations, the compressed air source 302 may be a component that is independent of the vehicle, such as a portable or remote air compressor, a compressed air cylinder, etc. The compressed air source 302 is in fluid (e.g., air) communication with and fluidly coupled to a tank 310. In some implementations, the fluid coupling of the compressed air source 302 may be by piping, hosing, direct attachment, and/or any other manner to enable fluid, such as air from the compressed air source 302, to flow into the tank 310. As will be described in greater detail below, the controller mechanism 350 of the present example controls the compressed air source 302 and/or the flow of compressed air from the compressed air source 302 such that a pressure of approximately 8 bar, inclusive, to approximately 10 bar, inclusive, is maintained for the reductant delivery system 300. In some implementations, the controller mechanism may include a control module for electronic control. In other implementations, other pressures may be utilized and the foregoing is merely an example. In addition, while the present example discusses the controller mechanism 350 in terms of processing modules for electronic control, it should be understood that mechanical control of the compressed air source 302 may be implemented as well using components such as actuators, servos, hydraulics, vacuum lines, motors, etc.

The reductant delivery system 300 shown in FIG. 3 includes an air-oil separator 304 interposed between the compressed air source 302 and the tank 310 and in fluid communication with and fluidly coupled to the compressed air source 302 and the tank 310. By way of example only, the compressed air source 302 is fluidly coupled to the air-oil separator 304 by piping, hosing, direct attachment, and/or any other manner to enable fluid, such as air from the compressed air source 302, to flow into the air-oil separator 304. The air-oil separator 304 may include a coalescing filter to remove oil from the compressed air of the compressed air source 302. The air-oil separator 304 may be useful if the compressed air source 302 is a compressed air source of the vehicle that may introduce oil into the air, such as the lubrication for a turbocharger, supercharger, or other air compressor. Of course, it should be understood that the air-oil separator 304 may be omitted entirely from the reductant delivery system 300.

The compressed air source 302 is fluidly coupled to the tank 310, with or without the intervening air-oil separator 304. In the example shown, the compressed air source 302 is fluidly coupled to an upper portion 312 of the tank 310. In other implementations, the compressed air source 302 may be fluidly coupled to a lower portion 314 of the tank 310. The tank 310 of the present example is configured to contain a vehicular fluid at the lower portion 314 to be pressurized by the compressed air from the compressed air source 302. In some implementations, the vehicular fluid includes a reductant, such as ammonia or urea, for the SCR system. The tank 310 may be constructed such that an internal pressure of approximately 8 bar, inclusive, to approximately 10 bar, inclusive may be maintained. Of course, other constructions for the tank 310 may be used as well, including those constructed for internal pressures lower than 8 bar or those greater than 10 bar, as the 8 bar-10 bar range is merely exemplary in nature. The tank 310 includes an outlet or suction point at approximately the bottom of the lower portion 314 of the tank 310. The positioning of the outlet at or near the bottom of the tank 310 may reduce the likelihood of air from the compressed air source 302 and/or compressed air within the tank 310 from exiting the tank 310 via the outlet. The tank 310 of the present example includes a filter 316 coupled to the lower portion 314 and positioned substantially at the outlet of the tank 310 to substantially prevent particulate matter (e.g., dust, dirt, etc.) from exiting with the vehicular fluid through the outlet.

The tank 310 is in fluid communication with and fluidly coupled to a dosing module 340 via the outlet. The fluid coupling of the tank 310 may be by piping, hosing, direct attachment, and/or any other manner to enable fluid, such as the vehicular fluid within the tank 310, to flow to the dosing module 340. In some implementations, the tank 310 may include a selectively openable portion, such as a cap, such that vehicular fluid may be added to the tank 310. In other examples, the tank 310 may be configured to be removeable such that an empty tank 310 (e.g., a tank 310 having no vehicular fluid or very little vehicular fluid) may be decoupled from the reductant delivery system 300 and replaced with a replacement tank 310 having vehicular fluid. In some implementations, the tank 310 may be an approximately 30 gallon tank 310. In other implementations, the fluid of the tank 310 may be other vehicular fluids, such as diesel fuel, gasoline, ethanol, etc.

The tank 310 is in fluid communication with and fluidly coupled to the dosing module 340. The dosing module 340 is positioned within a portion 190 of an exhaust system such that the dosing module 340 introduces the pressurized vehicular fluid from the tank 310 into the exhaust gases flowing through the portion 190 of the exhaust system. The dosing module 340 is configured to spray or vaporize the vehicular fluid, such as a reductant like urea, to promote mixing with the exhaust gases of the exhaust system.

In the reductant delivery system 300 shown in FIG. 3, a monometer 330 is interposed between the outlet of the tank 310 and the dosing module 340 and in fluid communication with and fluidly coupled to the tank 310 and the dosing module 340. For example, the manometer 330 may be coupled to and/or within a fluid line coupling the outlet of the tank 310 to the dosing module 340. In another example, the manometer 330 may be coupled to or within the tank 310. The manometer 330 is configured to measure the pressure, either within the fluid line or within the tank 310, and output a signal indicative of the pressure. As will be described in greater detail below, the manometer 330 is electrically coupled to the controller mechanism 350 such that the controller mechanism 350 receives and uses the signal output from the manometer 330 to control the dosing module 340, the compressed air source 302 and/or any other component of the reductant delivery system 300. Of course, it should be understood that the manometer 330 may be omitted entirely from the reductant delivery system 300. In other implementations, two manometers 340 may be utilized, such as a first manometer coupled to and/or within a fluid line coupling the outlet of the tank 310 to the dosing module 340 and a second manometer 340 within the tank 310 such that the pressure within the fluid line coupling the outlet of the tank 310 to the dosing module 340 and the pressure within the tank 310 can be monitored. Of course, other pressure sensors other than manometers 340 may be utilized.

A relief valve 320 is also in fluid communication with and fluidly coupled to the tank 310 and the dosing module 340. In the schematic example shown in FIG. 3, the relief valve 320 is coupled to a fluid line that connects the tank 310 to the dosing module 340, though this is merely an example. In other implementations, the relief valve 320 may be directly coupled to the tank 310, the dosing module 340, or other components of the reductant delivery system 300. In addition to being coupled to the fluid line connecting the tank 310 to the dosing module 340, the relief valve 320 is also fluidly coupled to another fluid line 305 connected to the upper portion 312 of the tank 310. The relief valve 320 is configured to selectively purge the vehicular fluid, such as a diesel exhaust fluid of urea, from the fluid line coupling the tank 310 to the dosing module 340. In some implementations, the relief valve 320 is further configured to purge the compressed air from within the tank 310. In the example shown, when the relief valve 320 is opened, compressed air from within the upper portion 312 of the tank 310 enters the fluid line connecting the tank 310 to the dosing module 340 to purge the vehicular fluid back into the tank 310 and/or out of the dosing module 340 and to decrease the air pressure within the tank 310. As will be described in greater detail herein, the relief valve 320 is configured to selectively purge the fluid line and the compressed air in response to deactivation of the vehicle.

In the example reductant delivery system 300 shown in FIG. 3, it should be understood that the system 300 does not include a vehicular fluid pump in fluid communication between the tank 310 and the dosing module 340. Accordingly, the control of delivery of the vehicular fluid of the tank 310 to the dosing module 340 is only controlled by the compressed air of the compressed air source 302 pressurizing the tank 310. Thus, vehicular fluid pumps are eliminated from the reductant delivery system 300, thereby potentially reducing the cost and/or complexity of the system while still permitting effective control and delivery of the vehicular fluid from the tank 310 to the dosing module 340 at a desired pressure for effective dosing of the vehicular fluid to the component of the vehicle, such as a diesel exhaust fluid of urea to a portion 190 of the exhaust system.

Figure 4:
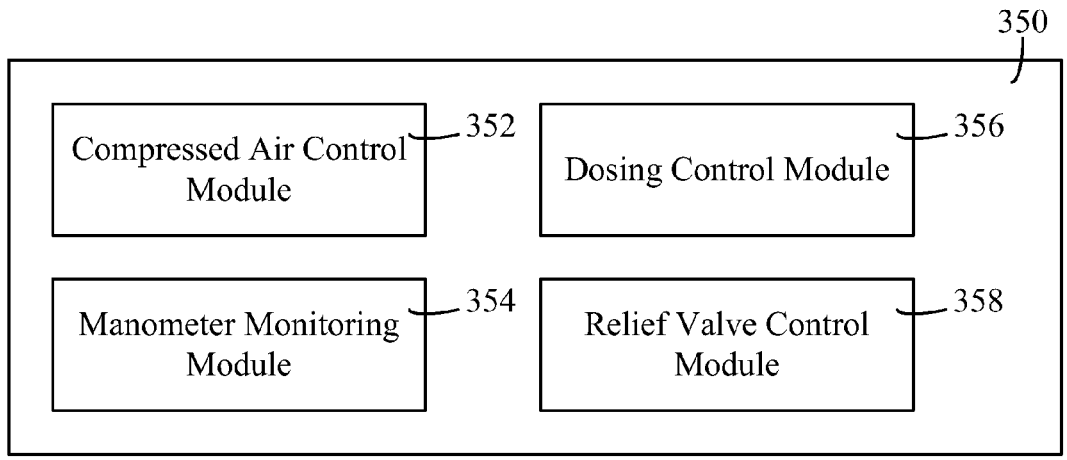
FIG. 4 is a block schematic diagram of a control module having several sub-modules for controlling components of the reductant delivery system of the selective catalytic reduction system of FIG. 3.

The reductant delivery system 300 also includes a controller mechanism 350 to control one or more components of the SCR system. In one implementation, the controller mechanism 350 may include a control module to functionally execute operations to control the one or more components of the SCR system. The controller mechanism 350 of the implementation shown in FIG. 3 includes a control module electrically coupled to the compressed air source 302, the relief valve 320, the manometer 330, and the dosing module 340 (shown by phantom lines). In certain embodiments, the control module of the controller mechanism 350 forms a portion of a processing subsystem including one or more computing devices having memory, processing, and communication hardware. For instance, the controller mechanism 350 may be implemented by an engine control module (ECM). The control module of the controller mechanism 350 may be a single device or a distributed device, and the functions of the control module of the controller mechanism 350 may be performed by hardware or software. The control module of the controller mechanism 350 may include a number of sub-modules structured to functionally execute the operations of the controller mechanism 350. For example, referring to FIG. 4, the control module of the controller mechanism 350 includes a compressed air control module 352, a manometer monitoring module 354, a dosing control module 356, and a relief valve control module 358. In some implementations, one or more of the foregoing modules may be implemented via mechanical components, such as actuators, servos, hydraulics, vacuum lines, motors, etc.

In some implementations, the compressed air control module 352 is configured to selectively activate and deactivate the compressed air source 302. For example, if the compressed air source 302 is an air compressor that is independent of the vehicle, such as a portable or remote air compressor, then compressed air control module 352 is configured to selectively activate or deactivate the compressed air source 302 to regulate an amount of resulting pressure in the tank 310. In other implementations, the compressed air control module 352 is configured to selectively open or close a valve (not shown) to selectively permit compressed air into the tank 310 from the compressed air source 302 to regulate the amount of pressure in the tank 310. For example, if the compressed air source 302 is an air compressor coupled to the engine, a turbocharger, a supercharger, and/or any other compressed air generating source of a vehicle, then the compressed air control module 352 is configured to selectively open or close a valve to pressurize the tank 310 as needed. The compressed air control module 352 receives an input signal from an ignition indicating the activation of the vehicle, which causes the compressed air control module 352 to activate the compressed air source 302 and/or open the valve. In other implementations, the compressed air control module 352 may receive an output from the relief valve control module 358 indicating that the relief valve 320 is closed and/or that the vehicle is activated. In some implementations, the compressed air control module 352 may be implemented by mechanically using components such as actuators, servos, hydraulics, vacuum lines, motors, etc.

The compressed air control module 352 receives data indicative of the pressure within the tank 310 and/or within a fluid line from the tank 310 to the dosing module 340 from a manometer monitoring module 354 of the controller mechanism 350. The manometer monitoring module 354 receives a signal from the manometer 330 indicative of the pressure within the tank 310 or a fluid line from the tank 310 to the dosing module 340. The manometer monitoring module 354 may receive the signal and convert the raw signal into a value for the compressed air control module 352 to utilize in determining whether to selectively activate or deactivate the compressed air source 302 and/or to selectively open or close a valve between the compressed air source 302 and the tank 310. For example, the manometer monitoring module 354 may receive the raw signal data and convert the signal data into a pressure value in bar units. Of course, in other implementations, the output from the manometer monitoring module 354 may be pressure values in other units, such as Pascals, atms, pounds per square inch (psi), inches of Mercury (in Hg), millimeters of Mercury (mmHg), Torrs, etc. In some implementations, the manometer monitoring module 354 may be implemented by mechanically using components such as valves, hydraulics, vacuum lines, etc.

The controller mechanism 350 further includes a dosing control module 356. The dosing control module 356 is configured to control the dosing module 340 to selectively dose the vehicular fluid of the tank 310 into the portion 190 of an exhaust system. In some implementations, the dosing control module 356 of the present example receives the pressure value outputted by the manometer monitoring module 354. In further implementations, the dosing control module 356 may receive inputs from other sensors, such as an exhaust temperature sensor, a $NO_x$ sensor, and/or any other sensor for controlling the amount of vehicular fluid, such as a diesel exhaust fluid of urea, to be introduced into the portion 190 of the exhaust system.

The controller mechanism 350 also includes a relief valve control module 358. The relief valve control module 358 is configured to control the relief valve 320 to selectively open and close a valve of the relief valve 320. In some implementations, the relief valve control module 358 receives an input signal from an ignition indicative of whether the vehicle is activated or deactivated. When the vehicle is activated, the relief valve control module 358 closes the relief valve 320 or maintains the relief valve 320 in a closed position, thereby permitting the compressed air source 302 to pressurize the tank 310, any fluid lines in fluid communication with the tank 310, and the dosing module 340. The relief valve control module 358 may output a signal to the compressed air control module 352 indicating that the relief valve 320 is closed and/or that the vehicle is activated, thereby causing the compressed air control module 352 to activate the compressed air source 302 and/or open a valve to pressurize the tank 310 using compressed air from the compressed air source 302. In some implementations, the relief valve control module 358 may be implemented by mechanically using components such as actuators, servos, hydraulics, vacuum lines, motors, etc.

When the vehicle is deactivated, such as indicated by the signal received from the ignition, the relief valve control module 358 opens the relief valve 320 to purge the pressure from within the tank 310, any fluid lines in fluid communication with the tank 310, and the dosing module 340. The relief valve 320 may also purge the compressed air from within the tank 310. In some implementations, the relief valve control module 358 may also receive the pressure value outputted by the manometer monitoring module 354 to selectively purge the pressure from within the tank 310, any fluid lines in fluid communication with the tank 310, and the dosing module 340 during operation of the vehicle in instances where the pressure exceeds a value (such as 10 bar in one exemplary implementation). The relief valve control module 358 may output a signal to the compressed air control module 352 indicating that the relief valve 320 is open and/or that the vehicle is deactivated, thereby causing the compressed air control module 352 to deactivate the compressed air source 302 and/or close a valve between the tank 310 and the compressed air source 302.

Figure 5:
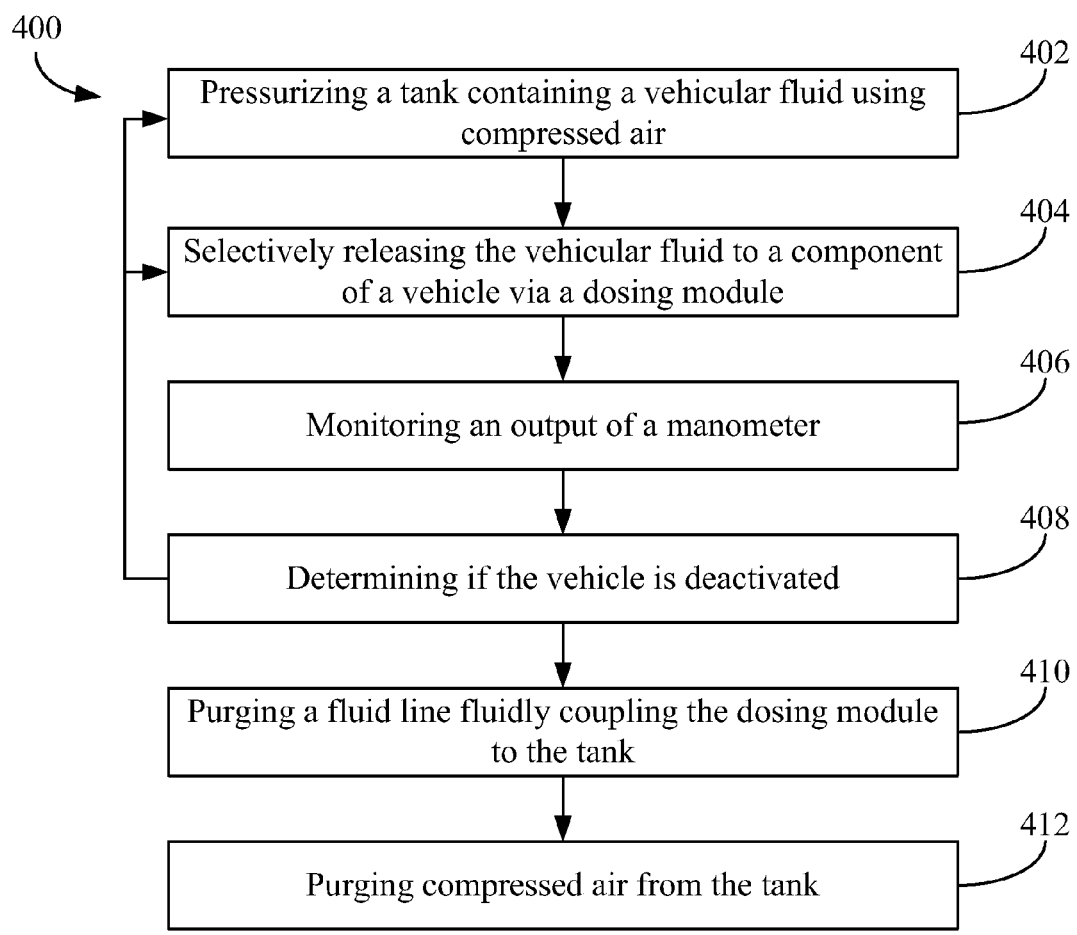
FIG. 5 is a flow diagram of an example method for operating the reductant delivery system of the selective catalytic reduction system of FIG. 3.

FIG. 5 depicts a flow diagram of an example method 400 for operating the reductant delivery system 300 of the selective catalytic reduction system shown in FIG. 3. The process 400 begins by pressurizing the tank 310 containing a vehicular fluid, such as a diesel exhaust fluid of urea, using compressed air (block 402). The compressed air is received from a compressed air source 302. In some implementations, the pressurization may occur by activating the compressed air source 302. In other implementations, the pressurization may occur by opening a valve interposed and in fluid communication with the compressed air source 302 and the tank 310. In some implementations, the pressurization may be controlled by the compressed air control module 352 after receiving an input signal from an ignition indicating the activation of the vehicle, thereby causing the compressed air control module 352 to activate the compressed air source 302 and/or open the valve. In other implementations, the compressed air control module 352 may receive an output from the relief valve control module 358 indicating that the relief valve 320 is closed and/or that the vehicle is activated. The pressurization of the tank 310 may continue until a pressure within the tank 310 and/or within a fluid line fluidly coupling the tank 310 to the dosing module 340 exceeds a value, such as 10 bar in one exemplary implementation. The pressure may be determined by a pressure sensor disposed within or coupled to the tank 310 and/or the a fluid line fluidly coupling the tank 310 to the dosing module 340, such as manometer 330.

The method 400 further includes selectively releasing the vehicular fluid to a component of the vehicle via the dosing module 340 (block 404). In some implementations, the component of the vehicle is a portion 190 of the exhaust system. The selective releasing of the vehicular fluid is controlled by a dosing control module 356 of the controller mechanism 350. The selective releasing of vehicular fluid via the dosing module 340 may be controlled based on the pressure value outputted by the manometer monitoring module 354, an exhaust temperature sensor, a $NO_x$ sensor, and/or any other sensor for controlling the amount of vehicular fluid, such as a diesel exhaust fluid of urea, to be introduced into the portion 190 of the exhaust system.

The method 400 further includes monitoring an output of the manometer 330 (block 406). The monitoring of the output of the manometer 330 is performed by the manometer monitoring module 354 of the controller mechanism 350. In some implementations, the tank 310 may be further pressurized using compressed air from the compressed air source 302 if the output indicative of the pressure within the tank 310 and/or a fluid line fluidly coupling the tank 310 to the dosing module 340 decreases below a first value, such as 8 bar. If the output of the manometer 330 indicates that the pressure decreases below the first value, then the compressed air source 302 may be activated and/or the valve may be opened to increase the pressure up to a second value, such as 10 bar. Once the pressure within the tank 310 exceeds the second value, as indicated by the output of the manometer 330 via the manometer monitoring module 354, the compressed air source 302 may be deactivated and/or the valve may be closed via the compressed air control module 352.

The method 400 includes determining whether the vehicle is deactivated (block 408). For example, the relief valve control module 358 receives input from an ignition indicative of whether the vehicle is activated or deactivated. If the vehicle remains activated, the method 400 may return to increase the pressure within the tank 310 containing the vehicular fluid using compressed air (block 402) if the output from the manometer 330 during the monitoring (block 406) indicates the pressure within the tank 310 has decreased below a predetermined value, for example 8 bar. If the monitoring of the output of the manometer 330 (block 406) indicates that a pressure within the tank 310 is above the predetermined value, for example 10 bar, then the method 400 may instead return to selectively release vehicular fluid to the component of the vehicle using the dosing module (block 404). If the determination indicates that the vehicle is deactivated, then the method 400 includes purging a fluid line coupling the dosing module 340 to the tank 310 (block 410) in response to the deactivation of the vehicle. The purging of the fluid line coupling the dosing module 340 to the tank 310 is controlled by the relief valve control module 358 of the controller mechanism 350. For example, the relief valve control module 358 may open a valve of the relief valve 320 to permit the vehicular fluid within a line coupling the tank 310 to the dosing module 340 to be expelled. The expelling of the vehicular fluid, such as a diesel exhaust fluid of urea, from the fluid lines may cause the vehicular fluid to be purged back into the tank 310 (such as via the fluid line 305) and/or into another container. In addition to, or in lieu of, the purging of the vehicular fluid back into the tank 310, the vehicular fluid may be purged out the dosing module 340 into the portion 190 of the exhaust system. In other instances, the purging of the vehicular fluid may simply expel the vehicular fluid out of the vehicle completely (e.g., into the environment or otherwise).

The method 400 also includes purging the compressed air from the tank 310 (block 412) in response to the deactivation of the vehicle. The purging of the compressed air from the tank 310 is also controlled by the relief valve control module 358 of the controller mechanism 350. For example, the relief valve control module 358 may open a valve of the relief valve 320 (or, in some implementations, a second relief valve) to permit the compressed air within the tank 310 to be expelled via fluid line 305. The purging of the compressed air from within the tank 310 may expel the compressed air to the portion 190 of the exhaust system or to the atmosphere. In some implementations, a filter may be coupled to an output of the relief valve 320 such that particulates or vaporized fluids in the compressed air may be filtered prior to expelling the compressed air to the portion 190 of the exhaust system or to the atmosphere. In some implementations, the purging of the fluid line coupling the dosing module 340 to the tank 310 (block 410) and the purging of compressed air from the tank 310 (block 412) may occur substantially at the same time.

Certain operations are described herein as receiving input and/or output values. The receiving input and/or output values, as utilized herein, includes receiving or outputting values by any method known in the art, including at least receiving or outputting values from a datalink or network communication, receiving or outputting an electronic signal (e.g. a voltage, frequency, current, or PWM signal) indicative of the value, receiving or outputting a software parameter indicative of the value, reading the value from a memory location on a computer readable medium, etc.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the portion of the SCR system as shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system for supplying a fluid in a vehicle, comprising: a compressed air source; a tank in fluid communication with the compressed air source, the tank configured to contain a vehicular fluid, the tank including an outlet at a bottom of a lower portion of the tank;
a dosing module in fluid communication with the tank via the outlet, the dosing module in fluid communication with a component of a vehicle that receives the vehicular fluid; and
a controller mechanism coupled to the compressed air source and the dosing module, the controller mechanism configured to:
regulate an amount of air pressure in the tank, and
control the dosing of the vehicular fluid using the dosing module,
wherein the system does not include a vehicular fluid pump such that compressed air from the compressed air source pressurizes the dosing module with the vehicular fluid.

2. The system of claim 1, wherein the vehicular fluid comprises urea.

3. The system of claim 1, wherein the compressed air source is provided by a vehicle compressed air source or an air compressor.

4. The system of claim 1, further comprising an air-oil separator in fluid communication with the compressed air source and the tank, the air-oil separator interposed between the compressed air source and the tank.

5. The system of claim 1 further comprising a relief valve in fluid communication with the tank and the dosing module, the relief valve configured to purge the vehicular fluid from a fluid line fluidly coupling the dosing module to the tank and to purge compressed air from the tank.

6. The system of claim 1, wherein the compressed air source is in fluid communication with and coupled to an upper portion of the tank, and wherein the dosing module is in fluid communication with and coupled to a lower portion of the tank.

7. The system of claim 6, wherein the tank comprises a filter coupled to the lower portion of the tank in fluid communication with the dosing module.

8. The system of claim 1, wherein the controller mechanism comprises a control module electrically coupled to the compressed air source and dosing module.

9. The system of claim 8, further comprising a manometer in fluid communication with the tank, the manometer outputting a signal to the control module indicative of a pressure within at least one of the tank or a fluid line fluidly coupling the tank and the dosing module.

10. The system of claim 8, wherein the control module is configured to cause the relief valve to purge the vehicular fluid from the fluid line and the compressed air from the tank upon a deactivation of the vehicle.

11. The system of claim 8, wherein the control module is further electrically coupled to the dosing module, and wherein the control module is configured to control dosing of the vehicular fluid to the component of the vehicle that receives the vehicular fluid.

12. A method of controlling delivery of a vehicular fluid, comprising:
pressurizing, using a control module, a tank containing the vehicular fluid using compressed air from a compressed air source, the tank including an outlet at a bottom of a lower portion of the tank; and
selectively releasing, using the control module, the vehicular fluid to a component of a vehicle via a dosing module, the dosing module fluidly coupled to the tank via the outlet,
wherein no vehicular fluid pump is in fluid communication with either the tank or the dosing module such that the compressed air from the compressed air source pressurizes the dosing module with the vehicular fluid.

13. The method of claim 12 wherein the vehicular fluid comprises urea.

14. The method of claim 13 further comprising purging, using the control module, a fluid line fluidly coupling the dosing module to the tank in response to a deactivation of the vehicle.

15. The method of claim 14 further comprising purging, using the control module, compressed air from the tank in response to the deactivation of the vehicle.

16. A reductant delivery system for supplying a fluid for a selective catalytic reduction system of a vehicle having an engine that produces an exhaust gas containing nitrogen oxide, the reductant delivery system consisting essentially of:
   a compressed air source;
   a tank in fluid communication with the compressed air source, the tank configured to contain a diesel exhaust fluid, the tank including an outlet at a bottom of a lower portion of the tank;
   a dosing module in fluid communication with the tank via the outlet, the dosing module in fluid communication with a component of a vehicle that receives the diesel exhaust fluid;
   a relief valve in fluid communication with the tank and the dosing module, the relief valve configured to purge compressed air from the tank in response to a deactivation of the vehicle; and
   a controller mechanism coupled to the compressed air source, the controller mechanism configured to regulate an amount of air pressure in the tank.

17. The reductant delivery system of claim 16, wherein the diesel exhaust fluid comprises urea.

18. The reductant delivery system of claim 16, wherein the system does not include a vehicular fluid pump in fluid communication with the dosing module and the tank.

19. The reductant delivery system of claim 16 further consisting essentially of:
   a manometer in fluid communication with the tank, the manometer outputting a signal to the controller mechanism indicative of a pressure within at least one of the tank or a fluid line fluidly coupling the tank and the dosing module; and
   an air-oil separator in fluid communication with the compressed air source and the tank, the air-oil separator interposed between the compressed air source and the tank.

20. The reductant delivery system of claim 16, wherein the controller mechanism comprises a control module electrically coupled to the compressed air source, the control module configured to regulate an amount of air pressure in the tank.

* * * * *